Oct. 4, 1927.
D'ORSAY McC. WHITE
DISK WHEEL
Filed Sept. 21,
1,644,163
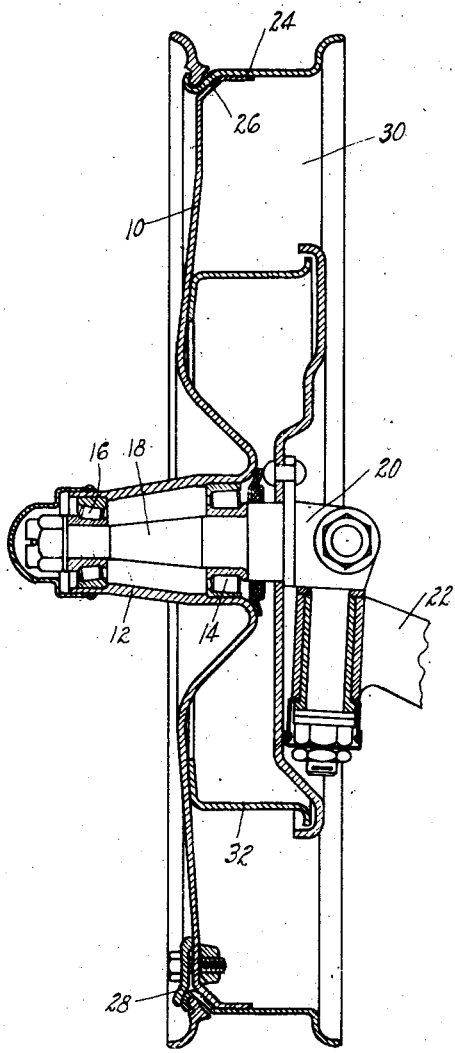
INVENTOR
D'ORSAY McCALL WHITE
BY
ATTORNEY Patented Oct. 4, 1927.

1,644,163

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

DISK WHEEL.

Application filed September 21, 1925. Serial No. 57,599.

This invention relates to disk wheels, and has for an object forming the wheel body and hub in one piece, and preventing undue strain on the hub (which will not usually be very heavy) by so arranging the parts that the brake drum and the tire are substantially bisected by a plane through the inner end of the hub. Thus the load on the wheel, whether from the brake or from road obstructions or merely from the weight of the car, comes directly on the strongest part of the hub and on the bearing in the base of the hub.

In the arrangement illustrated, the wheel disk is flared outwardly from the base of the hub, to give ample clearance for the brake, and to bring the disk into a plane between the ends of the hub, and is flanged inwardly at its outer edge, the flange terminating substantially in the plane of the inner end of the hub. The tire-carrying rim wedge onto this outer flange is substantially bisected by the described plane.

The above and other objects and features of the invention will be apparent from the following description of one illustrative embodiment shown in the accompanying drawing, in which:

The figure is a vertical section through one front wheel and associated parts.

As explained above, the disk body 10 of the wheel, and the hub 12, are in one piece, the disk body being flared outwardly just outside the hub into a plane between the ends of the hub. Inside the hub, there is an inner anti-friction bearing 14, taking the load, and an outer bearing 16 taking the side thrust, the two bearings supporting the spindle 18 of the front knuckle 20 swivelled to the axle 22.

The disk body 10, flared outwardly as described to clear the brake, is formed with an outer flange 24 terminating substantially in the plane of the base or inner end of the hub 12, and having a conical part 26 on which is wedged, by clamps 28, a demountable rim 30. Rim 30 is substantially bisected by the plane of the inner end of the hub.

The brake drum is in the form of a flange 32, welded or otherwise secured to the inner face of the disk body, and likewise substantially bisected by the plane of the inner end of the hub.

While one illustrative embodiment has been described in detail, it is not my intention to limit the scope of the invention to that particular embodiment, or otherwise than by the terms of the appended claims.

I claim:

1. A wheel having a disk body and hub in one piece, with the disk body flared outwardly to a plane between the ends of the hub, the wheel having a pair of coaxial flange parts projecting from its inner face, one serving as a brake drum and the other as a rim support, the brake drum being substantially bisected by a plane through the inner end of the hub.

2. A wheel having a disk body and hub in one piece, with the disk body flared outwardly to a plane between the ends of the hub, the wheel having a pair of coaxial flange parts projecting from its inner face, one serving as a brake drum and the other as a rim support having a conical wedge surface, the brake drum being substantially bisected by a plane through the inner end of the hub, together with a rim wedged on the conical surface and which is also substantially bisected by said plane.

3. A wheel having a disk body and hub in one piece, with the disk body flared outwardly just outside the hub to a plane between the ends of the hub and flanged inwardly at its outer edge and terminating substantially in the plane of the inner end of the hub, in combination with a rim secured on said flange and substantially bisected by said plane of the inner end of the hub, and a brake drum projecting inwardly from the inner side of the disk body and substantially bisected by the plane of the inner end of the hub.

4. A wheel having a disk body and hub in one piece, with the disk body flared outwardly just outside of the hub to a plane between the ends of the hub and flanged inwardly at its outer edge and terminating substantially in the plane of the inner end of the hub, in combination with a rim secured on said flange and substantially bisected by said plane of the inner end of the hub.

In testimony whereof I have hereunto signed my name.

D'ORSAY McCALL WHITE.